(12) United States Patent
Wurster

(10) Patent No.: US 10,816,090 B2
(45) Date of Patent: Oct. 27, 2020

(54) OIL SUPPLY SYSTEM OF AN AUTOMATIC TRANSMISSION OR AUTOMATED MANUAL TRANSMISSION IN A POWERTRAIN

(71) Applicant: VOITH PATENT GMBH, Heidenheim (DE)

(72) Inventor: Christoph Wurster, Lonsee-Ettlenschiess (DE)

(73) Assignee: Voith Patent GmbH, Heidenheim (DE)

( * ) Notice: Subject to any disclaimer, the term of this patent is extended or adjusted under 35 U.S.C. 154(b) by 227 days.

(21) Appl. No.: 15/761,640

(22) PCT Filed: Sep. 19, 2016

(86) PCT No.: PCT/EP2016/072115
§ 371 (c)(1),
(2) Date: Mar. 20, 2018

(87) PCT Pub. No.: WO2017/050674
PCT Pub. Date: Mar. 30, 2017

(65) Prior Publication Data
US 2018/0347691 A1 Dec. 6, 2018

(30) Foreign Application Priority Data

Sep. 24, 2015 (DE) .................. 10 2015 218 358

(51) Int. Cl.
*F16H 61/00* (2006.01)
*B60T 10/02* (2006.01)
(Continued)

(52) U.S. Cl.
CPC .......... *F16H 61/0021* (2013.01); *B60T 1/087* (2013.01); *B60T 10/02* (2013.01);
(Continued)

(58) Field of Classification Search
CPC .. F16H 61/0021; F16H 59/72; F16H 57/0417; F16H 41/30; F16D 57/04; B60T 1/087; B60T 10/02
See application file for complete search history.

(56) References Cited

U.S. PATENT DOCUMENTS

2011/0203668 A1   8/2011   Hofig et al.

FOREIGN PATENT DOCUMENTS

| DE | 102006030791 A1 | 1/2008 |
| DE | 102009035082 A1 | 2/2011 |
| WO | 2015105482 A1 | 7/2015 |

*Primary Examiner* — Huan Le
(74) *Attorney, Agent, or Firm* — Laurence A. Greenberg; Werner H. Stemer; Ralph E. Locher

(57) ABSTRACT

An oil supply system of an automatic transmission or an automated manual transmission in a power train has an oil pan and a pressure line for supplying elements of the transmission with pressurized oil. A pumping device pumps oil from the oil pan into the pressure line at a supply pressure $P_0$. A hydrodynamic converter, being a starting element, forms a subsection of the pressure line. A hydrodynamic retarder is disposed in a retarder oil circuit. At least a first switching valve, a second switching valve and a heat exchanger, wherein the heat exchanger is selectively switchable, by way of the switching valves, as a subsection into the pressure line or the retarder oil circuit. A temperature sensor is provided following the pumping device in the direction of flow in order to detect the oil temperature in the pressure line.

8 Claims, 2 Drawing Sheets

(51) Int. Cl.
 *B60T 1/087* (2006.01)
 *F16D 57/04* (2006.01)
 *B60W 10/10* (2012.01)
 *B60W 10/196* (2012.01)
 *B60W 30/18* (2012.01)
 *F16H 41/30* (2006.01)
 *F16H 57/04* (2010.01)
 *F16H 59/72* (2006.01)

(52) U.S. Cl.
 CPC .......... *B60W 10/10* (2013.01); *B60W 10/196* (2013.01); *B60W 30/18109* (2013.01); *F16D 57/04* (2013.01); *F16H 41/30* (2013.01); *F16H 57/0417* (2013.01); *B60W 2510/107* (2013.01); *B60W 2710/1033* (2013.01); *F16H 59/72* (2013.01)

OIL SUPPLY SYSTEM OF AN AUTOMATIC TRANSMISSION OR AUTOMATED MANUAL TRANSMISSION IN A POWERTRAIN

BACKGROUND OF THE INVENTION

Field of the Invention

The present invention relates to an oil supply system of an automatic transmission or an automated manual transmission in a powertrain and to a method for supplying an automatic transmission of this kind or an automated manual transmission as claimed in the independent claims.

Oil supply systems of automatic transmissions or automated manual transmissions conventionally have an oil pump in an oil supply line, by means of which oil is pumped from an oil pan into a pressure line in order to supply elements of the transmission with pressurized oil. The oil pump is driven by the internal combustion engine by means of which motive power is fed into a motor vehicle powertrain, in which the transmission with the oil supply system is provided in order to transmit motive power of the internal combustion engine to driven wheels of the motor vehicle. In general, the oil pump is positioned in the transmission. Such an oil pump is also referred to as a mechanical oil pump.

Among the various elements which are present in an automatic transmission or automated manual transmissions are clutches, brakes, a converter, a hydrodynamic brake (retarder) and the lubrication points of a transmission. The various elements require very different oil volumes at very different oil pressures at different points in time during the operation of the vehicle.

For reliable and fault-free operation of an automatic transmission or automated manual transmission, it is important, inter alia, that the oil temperature remains within certain limits.

SUMMARY OF THE INVENTION

It is the underlying object of the present invention to indicate an oil supply system for an automatic transmission or an automated manual transmission and a method by means of which increased operational reliability is achieved.

The object according to the invention is achieved by an oil supply system and a method having the features of the independent claims. Advantageous and particularly expedient embodiments of the invention are specified in the dependent claims.

An oil supply system according to the invention of an automatic transmission or an automated manual transmission has an oil pan and a pressure line for supplying elements of the transmission with pressurized oil. The elements are, for example, shifting elements such as clutches and/or brakes, in particular of the multidisk type, which are actuated to selectively set one of several possible transmission ratios between a transmission input shaft and a transmission output shaft of the transmission, thereby making it possible to form individual gear stages in the transmission.

Furthermore, elements such as a hydrodynamic converter, a hydrodynamic brake, retarders and the lubrication system, e.g. that for the bearings, are supplied or operated with the oil in the oil supply system. In particular, the oil in the oil supply system is used as a working medium for the converter and the retarder.

A pumping device is furthermore provided for pumping oil from the oil pan into the pressure line at a supply pressure P0. The pumping device is positioned in an oil line which merges into the pressure line or which forms the pressure line.

The pumping device can comprise an oil pump coupled to the engine or, alternatively, an oil pump driven by an electric motor or a combination of both.

The elements of the oil supply system furthermore include a hydrodynamic converter as a starting element, which forms a subsection of the pressure line, and a hydrodynamic retarder in a retarder oil circuit.

Provided in the pressure line are at least a first switching valve, a second switching valve and a heat exchanger, wherein the heat exchanger is selectively switchable, by means of the switching valves, as a subsection into the pressure line or the retarder oil circuit. The switching valves are preferably spring return valves and can be activated individually or jointly by means of an actuation valve.

According to the invention, a temperature sensor is provided after the pumping device in the direction of flow in order to detect the oil temperature in the pressure line.

By means of this positioning of the temperature sensor, it is possible, in particular, to detect critical temperatures in the pressure line. To further improve operational reliability, the temperature sensor can be provided after the hydrodynamic converter in the direction of flow.

Another alternative is a position of the temperature sensor between the first valve and the heat exchanger. A temperature sensor positioned here can be used, in particular, to control the converter and the retarder. If the oil temperature rises too steeply at this position in the pressure line, it is necessary to intervene in the control of the converter or the retarder to prevent overheating of the oil circuit.

Valves can furthermore be provided in the pressure line, by means of which valves the supply pressure P0, can be adjusted to different working pressures P1, P2, P3, wherein P0>P1>P2>P3, in subsections of the pressure line.

In another embodiment, a second temperature sensor can be present to measure the oil pan temperature, thereby further improving control of the transmission since the entire oil volume is taken into account.

A method according to the invention envisages that the oil temperature in the pressure line is measured irrespective of the operating state of the motor vehicle powertrain, wherein provision is furthermore made in the lockup mode: for determining the oil pan temperature;

DESCRIPTION OF THE INVENTION in the converter mode: for reducing the transmission input power when a first temperature limit Tmax W is exceeded;

in the retarder mode or in the braking mode: for reducing the retarder power when a second temperature limit Tmax R is exceeded.

The operating states include principally the starting mode with the converter, the driving mode with the converter locked up, the lockup mode and the braking mode, but they also include the operating states of the other units of the powertrain, such as the engine etc.

Provision can furthermore be made for the first temperature limit Tmax W and the second temperature limit Tmax R to be adapted to the operating state of the powertrain.

Thus, in a further step, the oil pan temperature can be determined by means of a calculation model, thus making it possible to eliminate a second temperature sensor for the measurement of the oil pan temperature.

In order to improve determination of the oil pan temperature, the calculation model can furthermore be calibrated in the time window in which the converter is operating in the lockup mode and the heat exchanger is switched into the pressure line by means of the valves. In this operating state, the oil is warmed only slightly by the elements.

BRIEF DESCRIPTION OF THE SEVERAL VIEWS OF THE DRAWING

The invention is explained in greater detail below by means of diagrams, in which

FIG. 1 shows a section of an oil supply system of a transmission, from which a particularly advantageous position of the temperature sensor 36a can be seen. The subsection shows all the essential elements which an oil supply system according to the invention for an automatic transmission or an automated manual transmission must have.

Details that are not shown, such as valves for pressure control or switching or controlling the elements can be taken from FIG. 2, by way of example. FIG. 2 shows an illustrative embodiment, from which it is possible to see all the details which are also described below.

Figure 1:
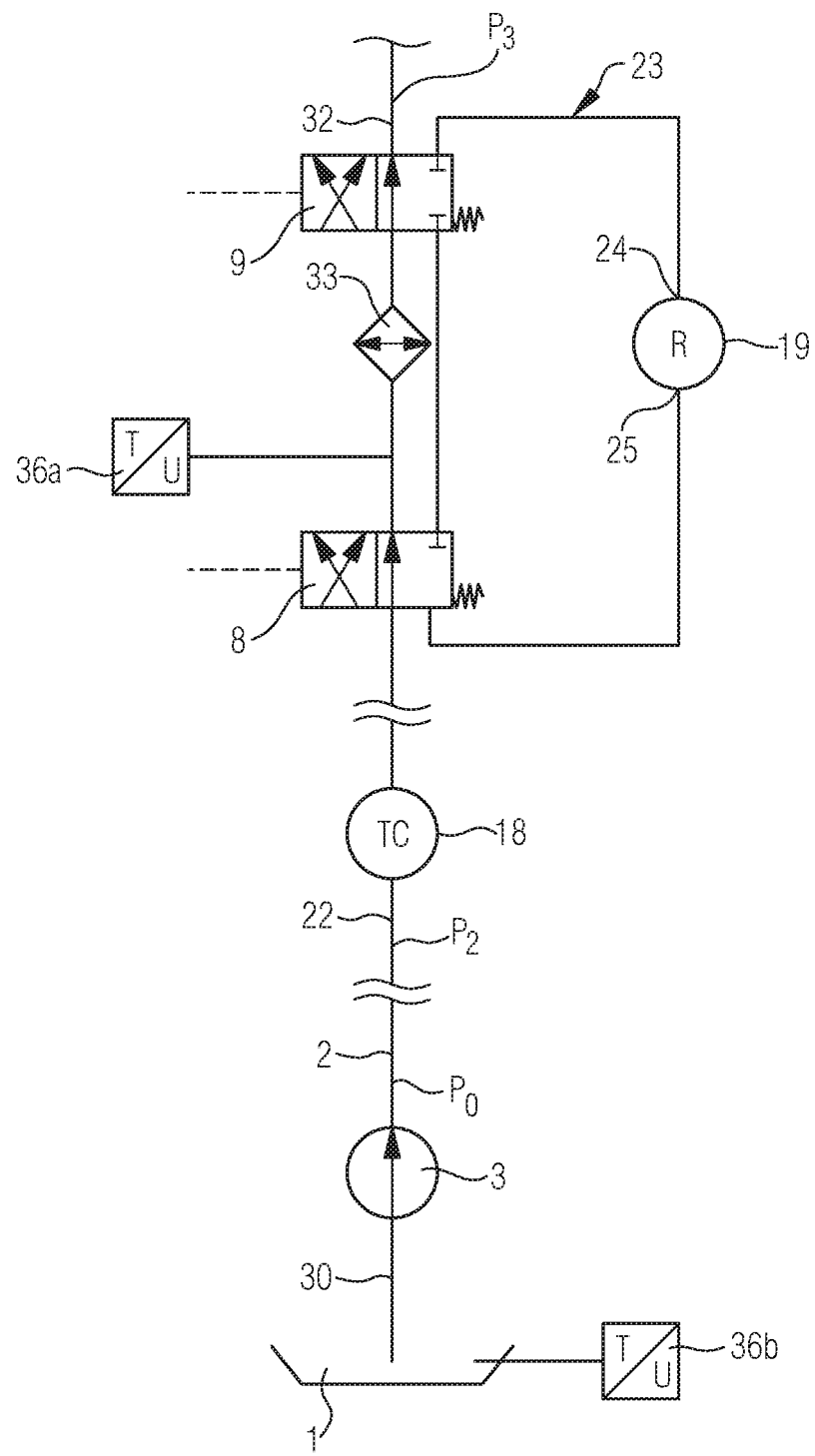
FIG. 1 shows a section of an oil supply system of a transmission with a temperature sensor.

To supply oil, an oil pumping device 3 is provided, by means of which oil is delivered or pumped into the pressure line 2, 12, 22, 32 via an oil line 30. The oil pressure is controlled in such a way that there is in pressure line section 2 a supply pressure P0, which is controlled by a valve (not shown). The supply pressure P0 is required for shifting the clutches and brakes of a transmission, for example, in order to exercise open-loop and/or closed-loop control over the shifting processes in the transmission.

Arranged further along the pressure line 2, 12, 22, 32, in pressure line 22, is the hydrodynamic converter 18. In this section of the pressure line, the oil pressure is lower, P2<P0. There is a flow of oil through the converter in all operating states.

Among the elements shown in the next section illustrated are the heat exchanger 33 and the retarder oil circuit 23. The valves 8 and 9 are embodied as 4/2-way valves. The switching of the valves 8 and 9 means that either the heat exchanger 33 is a subsection of the pressure line or the heat exchanger is integrated into the retarder oil circuit 23, with the result that the braking energy is dissipated by the heat exchanger during the operation of the retarder.

The temperature sensor 36a is installed between valve 8 and the heat exchanger 33. Thus, in the two switching positions of the valves 8, 9, the oil temperature of the oil can be measured either at the outlet of the converter 18 or of the retarder 19. To optimize the operation of the converter 18 and the retarder 19, different temperature limits may be critical. If the maximum temperature is exceeded, the converter 18 or the retarder 19 must be throttled back. The position of the sensor ahead of the heat exchanger 33 ensures optimum temperature monitoring since the actual process temperature is measured.

In contrast, the oil temperature in the oil pan is relevant only when the retarder is switched on and off frequently since, during this process, a relatively large amount of heated oil is discharged from the working chamber into the oil pan 1.

In the lockup mode, the oil in the converter is heated only insignificantly, and therefore the measured temperature at the sensor 36a in the lockup mode corresponds approximately to the oil pan temperature. The measured temperature can be input into a calculation model in order to calculate an oil pan temperature in the converter or retarder mode as well.

Figure 2:
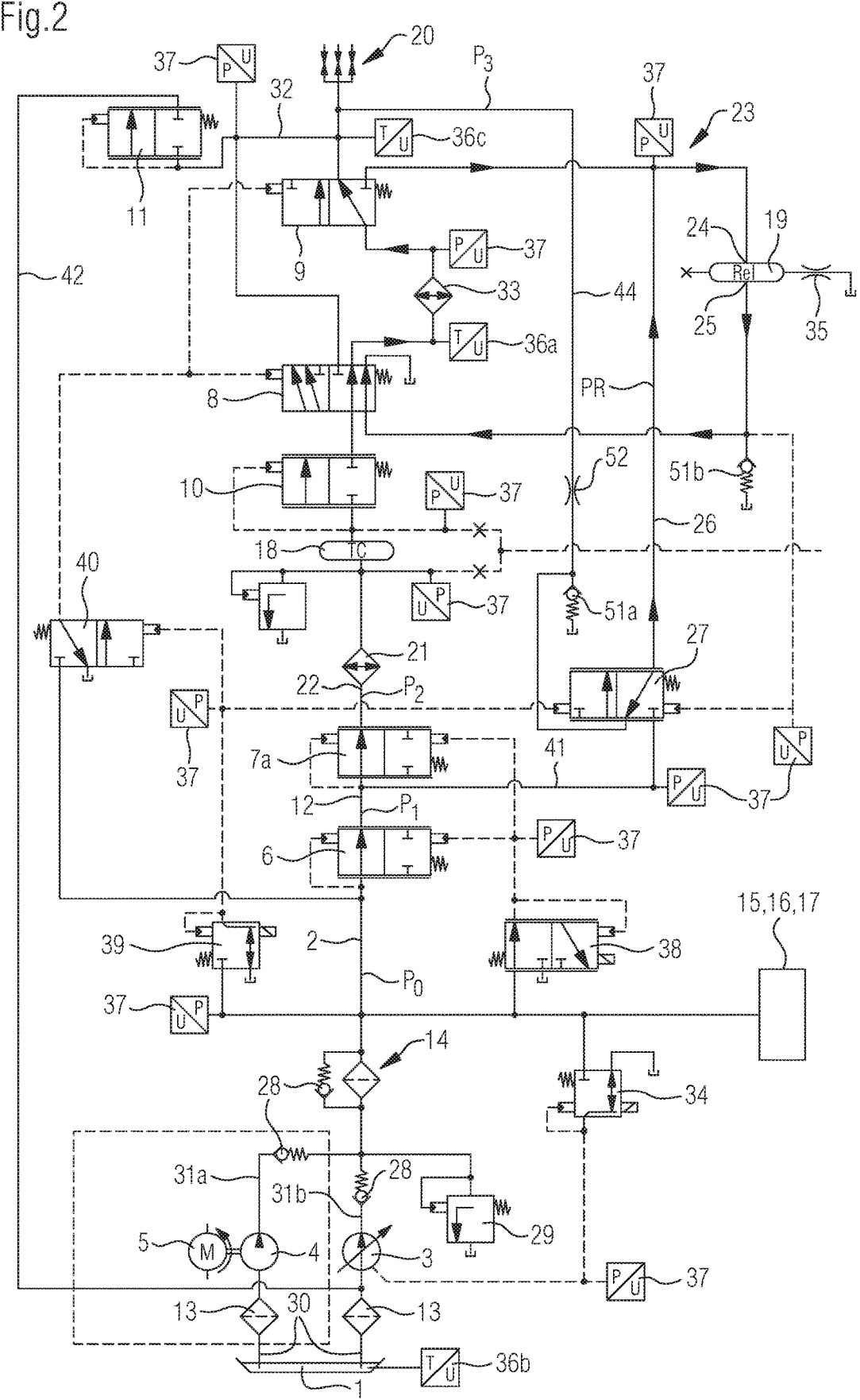
FIG. 2 shows an example of an embodiment of an oil supply system of a transmission.

FIG. 2 shows an illustrative embodiment of an oil supply system of a transmission with all the elements, in particular converter 18, retarder 19 and the lubrication points 20.

The oil supply for the shifting elements 17 branches off from pressure line section 2, wherein the individual shifting elements 17 are supplied with pressurized oil via lines 16 and the switching and control valves 15. The shifting elements 7 (which are not shown specifically here) can be clutches or brakes, the actuation of which is accomplished by means of the pressurized oil.

Two pumps 3 and 4 are provided here for the purpose of supplying oil. Here, pump 3 is coupled to the engine and embodied as a variable pump. Pump 4 is driven by means of an electric motor 5. The connection and control of the two oil pumps 3, 4 can be embodied in different ways, wherein it is ensured in each circuit that a supply pressure P0 can be set ahead of valve 6 and that an oil volume flow can always pass through the pressure line 2, 12, 22, 32 and valves 7, 8, 9 and 10 to the lubrication points 20 after valve 6.

Excess pressurized oil which is not required for lubrication 20 can be passed back to the intake side of the first oil pump 3 via the bypass line 42.

A hydrodynamic converter 18, which is flowed through by or supplied with pressurized oil is furthermore provided as a starting element in the pressure line 2, 12, 22, 32 in both embodiments illustrated. To cool the oil flow, two heat exchangers 21, 33 are provided, wherein one is positioned directly in the pressure line 2, 12, 22, 32 ahead of the converter 18. Another heat exchanger 33 is arranged between valves 8 and 9. This can be switched into the retarder operating circuit 23 to dissipate the waste heat of the retarder in accordance with the operating state of the powertrain.

To fill the retarder oil circuit 23, a filling line 26, 41, via which the retarder 19 can be supplied with oil from the pressure line 2, 12, 22, 32, branches off from the pressure line 2, 12, 22, 32 in the region of the first working pressure P1.

In the embodiment, a further heat exchanger 21 is installed ahead of the converter 18 in addition to heat exchanger 33. In this heat exchanger 21, the oil is cooled before it enters converter 18.

In the non-braking mode of the retarder 19, both heat exchangers 21, 33 are incorporated into the oil circuit at all times, with the result that, even in the converter mode, as little as possible heat is introduced into the oil pan 1 or the oil from the oil pan 1 can be cooled down as quickly as possible. In the braking mode of the retarder 19, only heat exchanger 33 is incorporated into the retarder oil circuit 23. The minimum oil flow is passed exclusively via heat exchanger 21.

Further details or elements illustrated in FIG. 2 are details which are required for the oil supply system but are not directly relevant to the embodiment according to the invention. No further details of these have been given here since they are widely known to those skilled in the art and the function thereof is apparent from the circuit diagrams. They include, in particular, the check valves 28 or the pressure-limiting valves 28.1, the sensors 36, 37 as well as the valves, filters etc. which are not mentioned.

The invention claimed is:

1. An oil supply system of an automatic transmission or an automated manual transmission in a power train, the oil supply system comprising:
   an oil pan;
   a pressure line for supplying elements of the transmission with pressurized oil;
   a pumping device for pumping oil from said oil pan into said pressure line at a supply pressure $P_0$;
   as a starting element, a hydrodynamic converter forming a subsection of said pressure line;
   a retarder oil circuit with a hydrodynamic retarder;
   a heat exchanger and switching valves, including at least a first switching valve and a second switching valve, disposed to selectively switch said heat exchanger as a subsection into said pressure line or into said retarder oil circuit; and
   a temperature sensor disposed to follow said pumping device in a direction of flow and configured to detect an oil temperature of the oil in said pressure line.

2. The oil supply system according to claim 1, wherein said temperature sensor is disposed to follow said hydrodynamic converter in the direction of flow.

3. The oil supply system according to claim 1, wherein said temperature sensor is arranged between said first valve and said heat exchanger.

4. The oil supply system according to claim 1, wherein said valves are disposed in said pressure line and configured to adjust the supply pressure $P_0$ to different working pressures $P_1$, $P_2$, $P_3$ within sub-sections of said pressure line, wherein $P_0 > P_1 > P_2 > P_3$.

5. The oil supply system according to claim 1, which comprises a further temperature sensor disposed to measure an oil pan temperature.

6. A method of supplying an automatic transmission or an automated manual transmission with pressurized oil, the method comprising:
   providing an oil supply system according to claim 1;
   measuring the oil temperature with the temperature sensor in the pressure line;
   operating in any of the following modes:
   in a lockup mode: determining an oil pan temperature;
   in a converter mode: reducing a transmission input power when a first temperature limit $T_{max\ W}$ is exceeded;
   in a retarder mode or a braking mode: reducing a retarder power when a second temperature limit $T_{max\ R}$ is exceeded.

7. The method according to claim 6, which comprises adapting the first temperature limit $T_{max\ W}$ and the second temperature limit $T_{max\ R}$ to an operating state of the power train.

8. An oil supply system of an automatic transmission or an automated manual transmission in a power train, the oil supply system comprising:
   an oil pan;
   a pressure line for supplying elements of the transmission with pressurized oil;
   a pumping device for pumping oil from said oil pan into said pressure line at a supply pressure $P_0$;
   as a starting element, a hydrodynamic converter forming a subsection of said pressure line;
   a retarder oil circuit with a hydrodynamic retarder;
   a heat exchanger and switching valves, including at least a first switching valve and a second switching valve, disposed to selectively switch said heat exchanger as a subsection into said pressure line or into said retarder oil circuit; and
   a temperature sensor disposed in a direction of flow between said pumping device and said heat exchanger, and configured to detect an oil temperature of the oil in said pressure line at a position between said heat exchanger and said pump, selectively when said heat exchanger is switched into said pressure line or when said heat exchanger is switched into said retarder oil circuit.

* * * * *